United States Patent
Naylor et al.

(10) Patent No.: US 9,538,581 B2
(45) Date of Patent: *Jan. 3, 2017

(54) HEATING UNIT FOR WARMING FLUID CONDUITS

(75) Inventors: David Naylor, Draper, UT (US); Thomas Caterina, Boise, ID (US)

(73) Assignee: 417 and 7/8 LLC, Park City, UT (US)

( * ) Notice: Subject to any disclaimer, the term of this patent is extended or adjusted under 35 U.S.C. 154(b) by 665 days.

This patent is subject to a terminal disclaimer.

(21) Appl. No.: 13/607,649

(22) Filed: Sep. 7, 2012

(65) Prior Publication Data

US 2012/0328274 A1 Dec. 27, 2012

Related U.S. Application Data

(63) Continuation of application No. 12/264,480, filed on Nov. 4, 2008, now abandoned, which is a (Continued)

(51) Int. Cl.
*F24H 1/10* (2006.01)
*H05B 1/02* (2006.01)
(Continued)

(52) U.S. Cl.
CPC ............ *H05B 1/0244* (2013.01); *H05B 3/56* (2013.01); *H05B 3/565* (2013.01); *F24D 13/022* (2013.01); *Y02B 30/26* (2013.01)

(58) Field of Classification Search
CPC ....... F24D 13/022; H05B 1/0244; H05B 3/56; H05B 3/565; H05B 1/0275; H05B 3/36; H05B 2203/003; H05B 2203/014; H05B 2203/017; H05B 2203/021; H05B 2203/029; Y02B 30/26
(Continued)

(56) References Cited

U.S. PATENT DOCUMENTS 1,455,287 A 5/1923 Hadley
1,455,297 A 5/1923 Lyons et al.
(Continued)

FOREIGN PATENT DOCUMENTS

CA 2210086 7/1996
CA 2598030 8/2006
(Continued)

OTHER PUBLICATIONS

U.S. Appl. No. 14/107,697, Dec. 16, 2013, Notice of Allowance.
(Continued)

*Primary Examiner* — Dana Ross
*Assistant Examiner* — James Sims, III
(74) *Attorney, Agent, or Firm* — Workman Nydegger

(57) ABSTRACT

A heating unit for use in heating a fluid conduit is disclosed. The heating unit includes first and second pliable cover layers. A pliable electrical heating element is disposed between the first and second cover layers. The pliable electrical heating element includes a heat generating element for converting electrical energy to heat energy and a heat spreading element that is attached to the heat generating element. The heat spreading element comprises carbon that is thermally coupled to the heat generating element for distributing the heat energy. A thermal insulation layer is attached to a second side of the pliable electrical heating element and is positioned adjacent the first cover layer. Additionally, a receiving power connector is electrically connected to the heat generating element and is configured to couple to an electrical power source. The heating unit is sized to substantially cover the fluid conduit.

20 Claims, 7 Drawing Sheets

Related U.S. Application Data continuation-in-part of application No. 11/835,641, filed on Aug. 8, 2007, now abandoned, which is a continuation-in-part of application No. 11/744,163, filed on May 3, 2007, now abandoned, which is a continuation-in-part of application No. 11/218,156, filed on Sep. 1, 2005, now Pat. No. 7,230,213, said application No. 12/264,480 is a continuation-in-part of application No. 11/422,580, filed on Jun. 6, 2006, now Pat. No. 7,880,121, and a continuation-in-part of application No. 11/218,156, filed on Sep. 1, 2005, now Pat. No. 7,230,213, said application No. 11/422,580 is a continuation-in-part of application No. 11/344,830, filed on Feb. 1, 2006, now Pat. No. 7,183,524, and a continuation-in-part of application No. 11/218,156, filed on Sep. 1, 2005, now Pat. No. 7,230,213.

(60) Provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
*H05B 3/56* (2006.01)
*F24D 13/02* (2006.01)

(58) Field of Classification Search
USPC .......... 392/482; 219/200–213, 527–529, 531
See application file for complete search history.

(56) References Cited

U.S. PATENT DOCUMENTS

| | | |
|---|---|---|
| 1,486,412 A | 3/1924 | Biddlecom |
| 2,014,657 A | 9/1935 | Marshall et al. |
| 2,342,077 A | 2/1944 | Jepson |
| 2,550,040 A | 4/1951 | Clar |
| 2,619,580 A | 11/1952 | Pontiere |
| 2,666,840 A | 1/1954 | Poirier |
| 2,697,163 A | 12/1954 | Spear |
| 2,706,237 A | 4/1955 | Hare et al. |
| 2,717,766 A | 9/1955 | Becker |
| 2,745,942 A | 5/1956 | Cohen |
| 2,779,526 A | 1/1957 | Vogt |
| 2,870,319 A | 1/1959 | Ford |
| 2,875,316 A | 2/1959 | Ford et al. |
| 2,889,445 A | 6/1959 | Wolf et al. |
| 2,907,859 A | 10/1959 | Walkoe |
| 2,963,565 A | 12/1960 | Moore et al. |
| 3,040,925 A | 6/1962 | Mills |
| 3,065,325 A | 11/1962 | Schlaich |
| 3,108,173 A | 10/1963 | Barrett et al. |
| 3,119,000 A | 1/1964 | Loch et al. |
| 3,130,289 A | 4/1964 | Katzman |
| 3,176,118 A | 3/1965 | Scott |
| 3,233,097 A | 2/1966 | Watkins |
| 3,345,497 A | 10/1967 | Porteous |
| 3,348,470 A | 10/1967 | Swanson |
| 3,380,087 A | 4/1968 | Petty et al. |
| 3,417,229 A | 12/1968 | Shomphe |
| 3,438,069 A | 4/1969 | Long |
| 3,454,746 A | 7/1969 | Dubois |
| 3,510,547 A | 5/1970 | Eisler |
| 3,516,485 A | 6/1970 | Mackay et al. |
| 3,649,725 A | 3/1972 | Olson |
| 3,659,077 A | 4/1972 | Olson |
| 3,662,512 A | 5/1972 | Zelnick |
| 3,691,343 A | 9/1972 | Norman |
| 3,694,622 A | 9/1972 | Bentley |
| 3,723,708 A | 3/1973 | Tulkoff |
| 3,729,614 A | 4/1973 | Martinet |
| 3,782,628 A | 1/1974 | Beaudet |
| 3,812,320 A | 5/1974 | Borgren |
| 3,852,569 A | 12/1974 | Potvin |
| 3,868,825 A | 3/1975 | Boyce |
| 3,881,091 A | 4/1975 | Day |
| 3,896,288 A | 7/1975 | Tulkoff |
| 3,897,928 A | 8/1975 | Eisler |
| 3,938,431 A | 2/1976 | Potvin |
| 3,968,348 A | 7/1976 | Stanfield |
| 3,988,791 A | 11/1976 | Simon |
| 4,000,815 A | 1/1977 | Wingbro |
| 4,060,710 A | 11/1977 | Reuter |
| 4,091,266 A | 5/1978 | Ito |
| 4,238,105 A | 12/1980 | West |
| 4,239,956 A | 12/1980 | Morton |
| 4,244,411 A | 1/1981 | Karlstrom |
| 4,250,397 A | 2/1981 | Gray |
| 4,250,398 A | 2/1981 | Ellis |
| 4,303,074 A | 12/1981 | Bender |
| 4,316,080 A | 2/1982 | Wroblewski |
| 4,401,880 A | 8/1983 | Eizenhoefer |
| 4,423,694 A | 1/1984 | Senneville |
| 4,457,491 A | 7/1984 | Dudman |
| 4,485,297 A | 11/1984 | Grise |
| 4,535,222 A | 8/1985 | Moen |
| 4,542,282 A | 9/1985 | Brasky |
| 4,549,069 A | 10/1985 | Oge |
| 4,607,154 A | 8/1986 | Mills |
| 4,625,394 A | 12/1986 | Kemnitz |
| 4,773,105 A | 9/1988 | Toyoshima |
| 4,777,344 A | 10/1988 | Nash et al. |
| 4,810,859 A | 3/1989 | Ababtawi |
| 4,815,154 A | 3/1989 | Grimes |
| 4,832,881 A | 5/1989 | Arnold |
| 4,855,573 A | 8/1989 | Vercillo |
| 4,899,031 A | 2/1990 | Dyer |
| 4,901,266 A | 2/1990 | Takagi |
| 4,919,270 A | 4/1990 | Govang et al. |
| 4,919,744 A | 4/1990 | Newman |
| 4,922,084 A | 5/1990 | Hutter |
| 4,931,627 A | 6/1990 | Watts |
| 4,935,602 A | 6/1990 | Bravo |
| 4,967,057 A | 10/1990 | Bayless |
| 4,967,097 A | 10/1990 | Mehl |
| 5,005,531 A | 4/1991 | Nelson |
| 5,049,724 A | 9/1991 | Anderson |
| 5,181,006 A | 1/1993 | Shafe |
| 5,198,063 A | 3/1993 | Howard |
| 5,201,868 A | 4/1993 | Johnson |
| 5,309,981 A | 5/1994 | Binder |
| 5,371,340 A | 12/1994 | Stanfield |
| 5,397,875 A | 3/1995 | Bechtold |
| 5,451,747 A | 9/1995 | Sullivan |
| 5,499,621 A | 3/1996 | Trihey |
| 5,550,350 A | 8/1996 | Barnes |
| 5,557,704 A | 9/1996 | Dennis et al. |
| 5,590,478 A | 1/1997 | Furness |
| 5,591,365 A | 1/1997 | Shields |
| 5,601,143 A | 2/1997 | Binder |
| 5,601,232 A | 2/1997 | Greenlee |
| 5,614,292 A | 3/1997 | Saylor |
| 5,669,221 A | 9/1997 | LeBleu |
| 5,684,689 A | 11/1997 | Hahn |
| 5,704,487 A | 1/1998 | Taravella et al. |
| 5,780,367 A | 7/1998 | Handwerker |
| 5,824,996 A | 10/1998 | Kochman |
| 5,827,050 A | 10/1998 | Price |
| 5,830,809 A | 11/1998 | Howard |
| 5,854,470 A | 12/1998 | Silva |
| 5,887,119 A | 3/1999 | Wesseltoft |
| 5,918,744 A | 7/1999 | Bringard et al. |
| 5,925,275 A | 7/1999 | Lawson |
| 5,931,381 A | 8/1999 | Fiedrich |
| 5,946,933 A | 9/1999 | Clarke et al. |
| 5,974,820 A | 11/1999 | Boyd |
| 5,974,830 A | 11/1999 | Colero |
| 5,986,243 A | 11/1999 | Campf |
| 5,990,454 A | 11/1999 | Westerberg |
| 5,994,669 A | 11/1999 | McCall |
| 6,051,811 A | 4/2000 | Hardison |

(56) References Cited

U.S. PATENT DOCUMENTS

| | | |
|---|---|---|
| 6,051,812 A | 4/2000 | Walker |
| 6,057,530 A | 5/2000 | Gurevich |
| 6,160,246 A | 12/2000 | Rock et al. |
| 6,180,929 B1 | 1/2001 | Pearce |
| 6,184,496 B1 | 2/2001 | Pearce |
| 6,189,487 B1 | 2/2001 | Owen |
| 6,202,849 B1 | 3/2001 | Graham |
| 6,211,493 B1 | 4/2001 | Bouman |
| 6,222,160 B1 | 4/2001 | Remke |
| 6,245,400 B1 | 6/2001 | Tzeng |
| 6,279,856 B1 | 8/2001 | Rutherford |
| 6,294,761 B1 | 9/2001 | Diedrich |
| 6,294,768 B1 | 9/2001 | Liebich |
| 6,303,905 B1 | 10/2001 | Chiles |
| 6,330,986 B1 | 12/2001 | Rutherford |
| 6,330,988 B1 | 12/2001 | Liu |
| 6,392,209 B1 | 5/2002 | Oppitz |
| 6,426,488 B2 | 7/2002 | Schielke |
| 6,426,489 B1 | 7/2002 | Elsasser |
| 6,432,336 B1 | 8/2002 | Mercuri |
| 6,452,138 B1 | 9/2002 | Kochman |
| 6,482,520 B1 | 11/2002 | Tzeng |
| 6,483,087 B2 | 11/2002 | Gardner |
| 6,503,626 B1 | 1/2003 | Norley |
| 6,550,645 B2 | 4/2003 | Nelson et al. |
| 6,614,992 B2 | 9/2003 | Schmitt |
| 6,631,603 B2 | 10/2003 | Zornes |
| 6,657,170 B2 | 12/2003 | Clothier |
| 6,664,520 B2 | 12/2003 | Clothier |
| 6,667,100 B2 | 12/2003 | Rutherford |
| 6,673,284 B2 | 1/2004 | Mercuri |
| 6,673,289 B2 | 1/2004 | Reynolds |
| 6,675,723 B2 | 1/2004 | Sukeva |
| 6,687,927 B1 | 2/2004 | Tharalson et al. |
| 6,740,381 B2 | 5/2004 | Day |
| 6,746,768 B2 | 6/2004 | Greinke |
| 6,770,848 B2 | 8/2004 | Haas et al. |
| 6,782,640 B2 | 8/2004 | Westin |
| 6,797,251 B1 | 9/2004 | Bennett |
| 6,822,198 B2 | 11/2004 | Rix |
| 6,841,250 B2 | 1/2005 | Tzeng |
| 6,841,757 B2 | 1/2005 | Marega et al. |
| 6,848,200 B1 | 2/2005 | Westin |
| 6,855,915 B2 | 2/2005 | Gehring |
| 6,886,233 B2 | 5/2005 | Rutherford |
| 6,897,417 B1 | 5/2005 | Usselman |
| 6,931,756 B2 | 8/2005 | Morgan |
| 6,943,320 B1 | 9/2005 | Bavett |
| 6,982,874 B2 | 1/2006 | Smalc |
| 7,049,559 B2 | 5/2006 | Ishii |
| 7,108,055 B2 | 9/2006 | Krassowski |
| 7,161,809 B2 | 1/2007 | Ford |
| 7,166,912 B2 | 1/2007 | Tzeng |
| 7,182,222 B2 | 2/2007 | Prabucki |
| 7,183,524 B2 | 2/2007 | Naylor |
| 7,186,309 B2 | 3/2007 | Mercuri |
| 7,230,213 B2 | 6/2007 | Naylor |
| 7,232,601 B2 | 6/2007 | Mercuri |
| 7,285,748 B2 | 10/2007 | Nelson et al. |
| 7,393,577 B2 | 7/2008 | Day |
| 7,393,587 B2 | 7/2008 | Krassowski |
| 7,880,121 B2 | 2/2011 | Naylor |
| 7,975,879 B2 | 7/2011 | Groesbeck |
| 8,258,443 B2 | 9/2012 | Caterina |
| 2002/0164483 A1 | 11/2002 | Mercuri |
| 2003/0052114 A1 | 3/2003 | Ek |
| 2003/0080114 A1 | 5/2003 | Harashima |
| 2003/0085215 A1 | 5/2003 | Rix |
| 2003/0097763 A1 | 5/2003 | Morgan |
| 2003/0111457 A1 | 6/2003 | Tidrick |
| 2003/0154736 A1 | 8/2003 | Lloyd |
| 2003/0155347 A1 | 8/2003 | Oh et al. |
| 2003/0164361 A1 | 9/2003 | Marega et al. |
| 2004/0004066 A1 | 1/2004 | Evans |
| 2004/0021529 A1 | 2/2004 | Bradley et al. |
| 2004/0025784 A1 | 2/2004 | Kawamura |
| 2004/0035853 A1 | 2/2004 | Pais |
| 2004/0221529 A1 | 11/2004 | Zornes |
| 2004/0226309 A1 | 11/2004 | Broussard |
| 2005/0160620 A1 | 7/2005 | Morgan |
| 2006/0289000 A1 | 12/2006 | Naylor |
| 2006/0289426 A1 | 12/2006 | Naranjo et al. |
| 2006/0289468 A1 | 12/2006 | Seibert |
| 2007/0181561 A1 | 8/2007 | Turletes |
| 2007/0262073 A1 | 11/2007 | Naylor |
| 2008/0272106 A1 | 11/2008 | Naylor |
| 2008/0277417 A1 | 11/2008 | Groesbeck |
| 2009/0056244 A1 | 3/2009 | Caterina |
| 2009/0101305 A1 | 4/2009 | Clark |
| 2009/0101632 A1 | 4/2009 | Naylor |
| 2009/0107972 A1 | 4/2009 | Naylor |
| 2009/0107975 A1 | 4/2009 | Caterina |
| 2009/0107986 A1 | 4/2009 | Naylor |
| 2009/0114633 A1 | 5/2009 | Naylor |
| 2009/0114634 A1 | 5/2009 | Naylor |
| 2009/0127251 A1 | 5/2009 | Naylor |
| 2009/0302023 A1 | 12/2009 | Caterina |
| 2009/0302027 A1 | 12/2009 | Caterina |
| 2011/0006080 A1 | 1/2011 | Naylor et al. |
| 2011/0174802 A1 | 7/2011 | Naylor |
| 2011/0266287 A1 | 11/2011 | Groesbeck |
| 2013/0001217 A1 | 1/2013 | Naylor |

FOREIGN PATENT DOCUMENTS

| | | |
|---|---|---|
| CA | 2598045 | 8/2006 |
| CA | 2685387 | 11/2008 |
| CA | 2680555 | 3/2010 |
| CA | 2684115 | 5/2010 |
| CA | 2684178 | 5/2010 |
| GB | 1387409 | 3/1975 |
| JP | 04350257 | 12/1992 |
| JP | 06129095 | 5/1994 |
| JP | 2001123667 | 8/2001 |
| WO | 2006088710 | 8/2006 |
| WO | 2008137726 | 11/2008 |
| WO | 2008137727 | 11/2008 |
| WO | 2009140194 | 11/2009 |
| WO | 2012170013 | 12/2012 |

OTHER PUBLICATIONS

U.S. Appl. No. 12/212,529, Jun. 18, 2014, Office Action.
GrafTech International "Dramatically Improve Your Radiant Floor Heating Performance" Copyright 2008 GrafTech International Holdings Inc. 1 page.
"The Future Looks Radiant", Full Line Radiant Catalog, http://www.wattsradiant.com 2007.
"Hotmesh", various pages from website, http://www.worldscientificdevelopment.com/hotmesh/motivation.html Retrieved on Aug. 8, 2008.
"GO Polymers" http://www.gopolymers.com/index.php?module-abs Retrieved on Aug. 8, 2008.
Julian Norley and Gary Chen "GrafTech High Performance, Lightweight Graphite Heat Sinks/Spreaders" IEEE May 14-16, 2002.
Grafoil Flexible Graphite "Typical Grafoil Sheet Properties" Available at Least by Nov. 16, 2010.
"Springfield Wire Inc." http://www.springfield-wire.com/category.cfm?Category=21 Retrieved on Aug. 8, 2008.
"Electrical Floor Heating", portion of catalog from Heating Catalog, http://www.wattsradiant.com Available at Least by Nov. 16, 2010.
"Mauritzon Concrete Curing Blankets" http://www.mauritzononline.com.concretecure.html Retrieved on Feb. 15, 2005.
"Concrete-Curing-Blankets.com" http://concrete-curing-blankets.com Retrieved on Feb. 15, 2005.
"Janell Concrete Curing Methods" http://www.janell.com/engineering_data.html Retrieved on Feb. 15, 2005.
"GrafTech Material Safety Data Sheet" Dated May 17, 2005.
Concrete Curing Technology, Inc. "Instructions for Use of Pad" Available at Least by Nov. 16, 2010.

(56) References Cited

OTHER PUBLICATIONS

"Q Foil Product Features" http://www.rotabolt.com.html/qfoil_2.html Available at Least by Nov. 16, 2010.
"Thawzall Product Selection" http://www.themachinecompany.com/products.htm Available at Least by Nov. 16, 2010.
"Ground Heaters S3000" http://www.groundheaters.com/s3000.htm Available at Least by Nov. 16, 2010.
"How it Works" http://www.groundheaters.com/how_it_works.htm Available at Least by Nov. 16, 2010.
"FP Parallel Constant Watt Heating Cable" Thermon Manufacturing Co. Available at Least by Nov. 16, 2010.
"SCS Concrete Curing Blankets" http://www.scsincorporated.com/curingblankets.htm Retrieved on Feb. 15, 2005.
"Thawzall Heater" http://www.themachinecompany.com/faq.htm Available at Least by Nov. 16, 2010.
"Q Foil Performance" http://www.rotabolt.com.html/qfoil_1.html Available at Least by Nov. 16, 2010.
"Q Foil Technology" http://www.rotabolt.com.html/qfoil.html Available at Least by Nov. 16, 2010.
U.S. Appl. No. 12/843,523, Mar. 1, 2013, Office Action.
U.S. Appl. No. 14/107,697, filed Dec. 16, 2013, Naylor.
U.S. Appl. No. 12/843,523, Sep. 16, 2013, Notice of Allowance.
U.S. Appl. No. 13/607,531, Oct. 10, 2013, Office Action.
U.S. Appl. No. 12/264,460, Jan. 31, 2014, Office Action.
U.S. Appl. No. 13/607,531, Sep. 7, 2012, Naylor.
U.S. Appl. No. 12/875,313, Sep. 3, 2010, Naylor.
U.S. Pat. No. 7,230,213, Jan. 25, 2006, Office Action.
U.S. Pat. No. 7,230,213, Aug. 28, 2006, Office Action.
U.S. Pat. No. 7,230,213, Feb. 7, 2007, Notice of Allowance.
U.S. Pat. No. 7,183,524, Jun. 1, 2206, Office Action.
U.S. Pat. No. 7,183,524, Nov. 29, 2006, Notice of Allowance.
U.S. Appl. No. 11/422,580, Mar. 15, 2007, Office Action.
U.S. Appl. No. 11/422,580, Jul. 27, 2007, Office Action.
U.S. Appl. No. 11/422,580, Dec. 11, 2008, Office Action.
U.S. Appl. No. 11/422,580, Nov. 16, 2009, Notice of Allowance.
U.S. Appl. No. 11/422,580, Apr. 15, 2010, Notice of Allowance.
U.S. Appl. No. 11/422,580, Aug. 17, 2010, Notice of Allowance.
U.S. Appl. No. 11/422,580, Nov. 22, 2010, Notice of Allowance.
U.S. Appl. No. 11/835,641, Sep. 1, 2010, Office Action.
U.S. Appl. No. 12/119,434, Sep. 29, 2010, Office Action.
U.S. Appl. No. 12/119,434, Mar. 3, 2011, Notice of Allowance.
U.S. Appl. No. 12/119,434, Jun. 14, 2011, Notice of Allowance.
U.S. Appl. No. 12/212,529, Sep. 23, 2011, Office Action.
U.S. Appl. No. 12/119,434, Oct. 26, 2011, Notice of Allowance.
U.S. Appl. No. 12/258,249, Mar. 7, 2012, Office Action.
U.S. Appl. No. 12/875,305, Mar. 8, 2012, Office Action.
U.S. Appl. No. 12/258,240, Mar. 14, 2012, Office Action.
U.S. Appl. No. 12/264,480, Mar. 14, 2012, Office Action.
U.S. Appl. No. 12/119,434, Mar. 14, 2012, Notice of Allowance.
U.S. Appl. No. 12/119,434, May 29, 2012, Notice of Allowance.
U.S. Appl. No. 12/433,974, Sep. 17, 2012, Office Action.
U.S. Appl. No. 12/212,529, May 11, 2012, Final Office Action.
U.S. Appl. No. 12/264,460, Aug. 20, 2012, Office Action.
U.S. Appl. No. 12/264,460, Mar. 28, 2013, Final Office Action.
U.S. Appl. No. 12/433,974, Apr. 11, 2013, Final Office Action.
U.S. Appl. No. 12/433,974, Aug. 7, 2014, Office Action.
U.S. Appl. No. 12/264,460, Sep. 8, 2014, Notice of Allowance.
International Search Report and Written Opinion for PCT/US2005/037414 dated Mar. 7, 2006.
International Search Report and Written Opinion for PCT/US2006/04437 dated Jul. 3, 2006.
International Search Report and Written Opinion for PCT/US2008/62481 dated Sep. 17, 2008.
International Search Report and Written Opinion for PCT/US2008/62479 dated Sep. 22, 2008.
International Search Report and Written Opinion for PCT/US2009/043443 dated Jul. 2, 2009.
International Search Report and Written Opinion for PCT/US2011/039489 dated Oct. 19, 2011.
U.S. Appl. No. 12/264,493, Mar. 5, 2010, Office Action.
U.S. Appl. No. 12/260,021, Mar. 5, 2010, Office Action.
U.S. Appl. No. 12/264,469, Mar. 8, 2010, Office Action.
U.S. Appl. No. 14/107,697, May 13, 2014, Notice of Allowance.
U.S. Appl. No. 14/107,697, Jul. 21, 2014, Notice of Allowance.
U.S. Appl. No. 14/107,697, Oct. 3, 2014, Notice of Allowance.
U.S. Appl. No. 12/264,460, Dec. 26, 2014, Notice of Allowance.
U.S. Appl. No. 13/607,437, Mar. 11, 2015, Office Action.
U.S. Appl. No. 12/433,974, Apr. 20, 2015, Final Office Action.
U.S. Appl. No. 12/212,529, May 8, 2015, Final Office Action.
U.S. Appl. No. 13/607,437, Aug. 21, 2015, Final Office Action.
U.S. Appl. No. 12/212,529, Oct. 6, 2015, Office Action.
U.S. Appl. No. 12/212,529, Mar. 21, 2016, Final Office Action.
U.S. Appl. No. 12/212,529, Oct. 6, 2016, Office Action.

HEATING UNIT FOR WARMING FLUID CONDUITS

CROSS-REFERENCE TO RELATED APPLICATIONS

This application is a continuation of U.S. patent application Ser. No. 12/264,480, filed on Nov. 4, 2008, now abandoned and titled HEATING UNIT FOR WARMING FLUID CONDUITS, which is a continuation-in-part of U.S. patent application Ser. No. 11/835,641, filed on Aug. 8, 2007, now abandoned and titled GROUNDED MODULAR HEATED COVER, which is a continuation-in-part of U.S. patent application Ser. No. 11/744,163, filed on May 3, 2007, now abandoned and titled MODULAR HEATED COVER, which is a continuation-in-part of U.S. patent application Ser. No. 11/218,156, filed on Sep. 1, 2005, and titled MODULAR HEATED COVER, now U.S. Pat. No. 7,230,213, issued on Jun. 12, 2007. U.S. patent application Ser. No. 12/264,480, filed on Nov. 4, 2008, and titled HEATING UNIT FOR WARMING FLUID CONDUITS, is also a continuation-in-part of U.S. application Ser. No. 11/422,580, filed on Jun. 6, 2006, now U.S. Pat. No. 7,880,121 and titled A RADIANT HEATING APPARATUS, which claims priority to U.S. Provisional Patent Application Ser. No. 60/688,146, filed on Jun. 6, 2005, and titled LAMINATE HEATING APPARATUS. U.S. patent application Ser. No. 11/422,580, filed on Jun. 6, 2006, and titled A RADIANT HEATING APPARATUS, is also a continuation-in-part of U.S. patent application Ser. No. 11/218,156, filed on Sep. 1, 2005, and titled MODULAR HEATED COVER, now U.S. Pat. No. 7,230,213, issued on Jun. 12, 2007, which claims priority to: U.S. Provisional Patent Application Ser. No. 60/654,702, filed on Feb. 17, 2005, and titled A MODULAR ACTIVELY HEATED THERMAL COVER; U.S. Provisional Patent Application Ser. No. 60/656,060, filed on Feb. 23, 2005, and titled A MODULAR ACTIVELY HEATED THERMAL COVER; and U.S. Provisional Patent Application Ser. No. 60/688,146, filed on Jun. 6, 2005, and titled LAMINATE HEATING APPARATUS. U.S. application Ser. No. 11/422,580, filed on Jun. 6, 2006, and titled A RADIANT HEATING APPARATUS, is also a continuation-in-part of U.S. patent application Ser. No. 11/344,830, filed on Feb. 1, 2006, and titled MODULAR HEATED COVER, now U.S. Pat. No. 7,183,524, issued on Feb. 27, 2007, which claims priority to: U.S. Provisional Patent Application Ser. No. 60/654,702, filed on Feb. 17, 2005, and titled A MODULAR ACTIVELY HEATED THERMAL COVER; U.S. Provisional Patent Application Ser. No. 60/656,060, filed on Feb. 23, 2005, and titled A MODULAR ACTIVELY HEATED THERMAL COVER; and U.S. Provisional Patent Application Ser. No. 60/688,146, filed on Jun. 6, 2005, and titled LAMINATE HEATING APPARATUS. U.S. patent application Ser. No. 11/344,830, filed on Feb. 1, 2006, and titled MODULAR HEATED COVER, now U.S. Pat. No. 7,183,524, issued on Feb. 27, 2007, is also a continuation-in-part of U.S. patent application Ser. No. 11/218,156, filed on Sep. 1, 2005, and titled MODULAR HEATED COVER, now U.S. Pat. No. 7,230,213, issued on Jun. 12, 2007. Each of the preceding United States patent applications and patents is incorporated herein in its entirety by this reference.

BACKGROUND

Background and Relevant Art

The ability to distribute heat has provided a number of opportunities for increasing human comfort levels for certain activities and has made other activities not previously feasible able to be accomplished. One field where external heating has found particular use is in industries where individuals work with liquid or gaseous materials. For example, when transporting liquids or gases through a conduit, such as a hose or pipe, it can be desirable to maintain the liquid or gas at a desired temperature or within a desired temperature range. Maintaining the fluid conduit at a desired temperature can provide numerous benefits, including preventing the liquid or gas from changing states during transportation, i.e., from a gas to a liquid, or from a liquid to a solid, freezing and/or breaking of the fluid conduit due to extreme temperatures, as well as delivering the liquid or gas at a particular temperature for an intended use.

Heating units of various types have been previously implemented for heating pipes. Typically pipe warmers are relatively long, narrow straps that wrap around a pipe to provide heat to the pipe and its contents. However, typical pipe warmers only cover a portion of the pipe. Pipe warmers constructed in this fashion often rely on the conductive nature of a metallic pipe to distribute heat to the contents of the pipe. However, these types of pipe warmers typically result in uneven heating of the pipe and its contents. In particular, most pipe heaters turn on at an activation temperature near 32° F. and only remain on while the temperature is below the activation temperature. Thus, the portion of the pipe and its contents near the pipe warmer may be maintained at the activation temperature, while other portions of the pipe and its contents may be insufficiently heated. If more even heat distribution is desired, multiple pipe warmers may be required. However, this requires the availability of multiple outlet receptacles and the use of additional power.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a heating unit for use in providing evenly distributed heat to one or more fluid conduits. The heating unit includes a first pliable cover layer and a second pliable cover layer. A pliable electrical heating element is disposed between the first and the second cover layers. The pliable electrical heating element includes a heat generating element for converting electrical energy to heat energy and a heat spreading element that is attached to the heat generating element. The heat spreading element comprises carbon that is thermally coupled to the heat generating element for distributing the heat energy. A thermal insulation layer is attached to a first side of the pliable electrical heating element and is positioned adjacent the first cover layer. Additionally, a receiving power connector is electrically connected to the heat generating element and is configured to couple to an electrical power source. The heating unit further includes a sealing flap and one or more fasteners. The one or more fasteners are disposed in the first and second pliable cover layers in a fashion allowing the heating unit to be wrapped and secured around one or more fluid conduits. The heating unit is sized to substantially cover the entire outer surface of the one or more fluid conduits.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed herein are embodiments of a heating unit for use in fluid conduit warming applications. In particular, embodiments may include a heating unit configured to substantially cover the entire outer surface of one or more fluid conduits, including substantially the full circumference of the fluid conduit. As used herein, fluid conduit may include hoses, pipes, tubes, channels, and the like. Additionally, while the heating unit of the present invention is described as being used to heat fluid conduits, it will be appreciated that the heating unit may also be used to provide heat to other objects. For example, wires, poles, and the like can also be heated using the heating unit disclosed herein.

Figure 1:
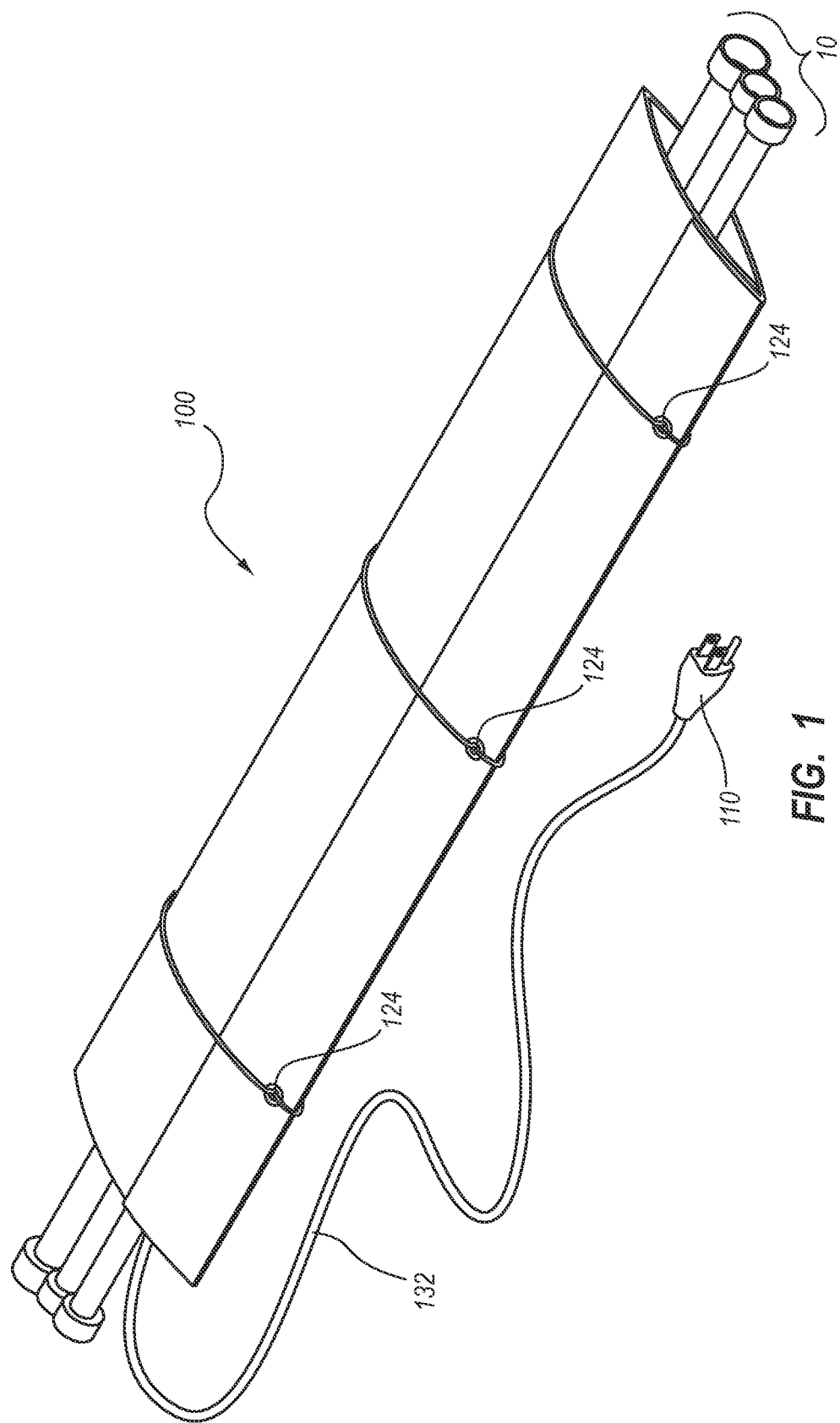
FIG. 1 illustrates a exemplary embodiment of a heating unit according to the present invention.

The heating unit includes a heating element which provides heat and spreads the heat over the surface of the heating unit. The heating unit may also include an insulation layer to prevent heat from being lost to an environment external to the fluid conduit. For example, FIG. 1 illustrates one embodiment of a heating unit configured as a fluid conduit warmer 100 covering multiple fluid conduits 10. While FIG. 1 illustrates the heating unit as a fluid conduit warmer, it will be appreciated that the heating unit can be sized, shaped, or otherwise configured to provide heat to other types of conduits and similar objects.

Figure 2:
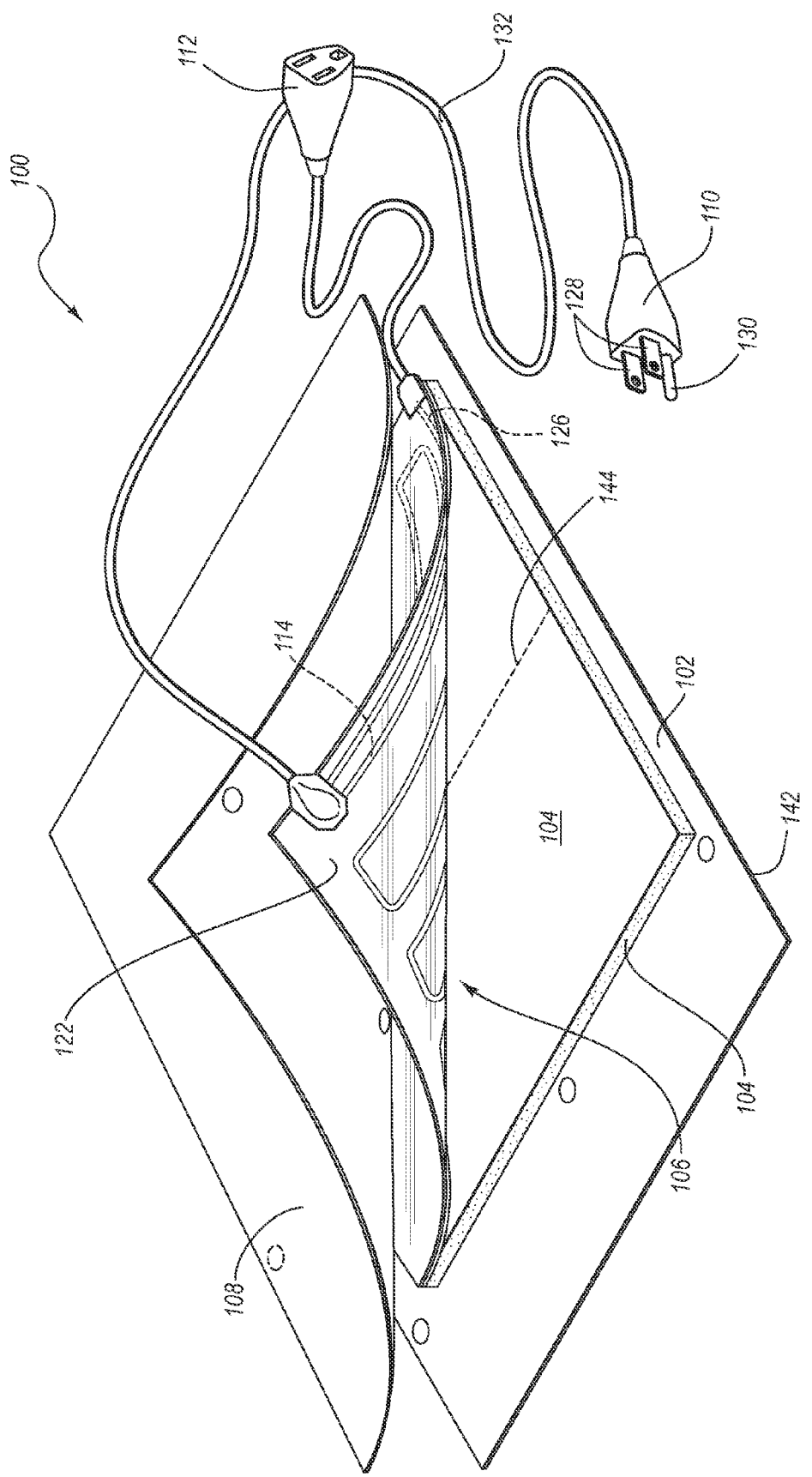
FIG. 2 illustrates a partially exploded view of the heating unit of FIG. 1.
Figure 3:
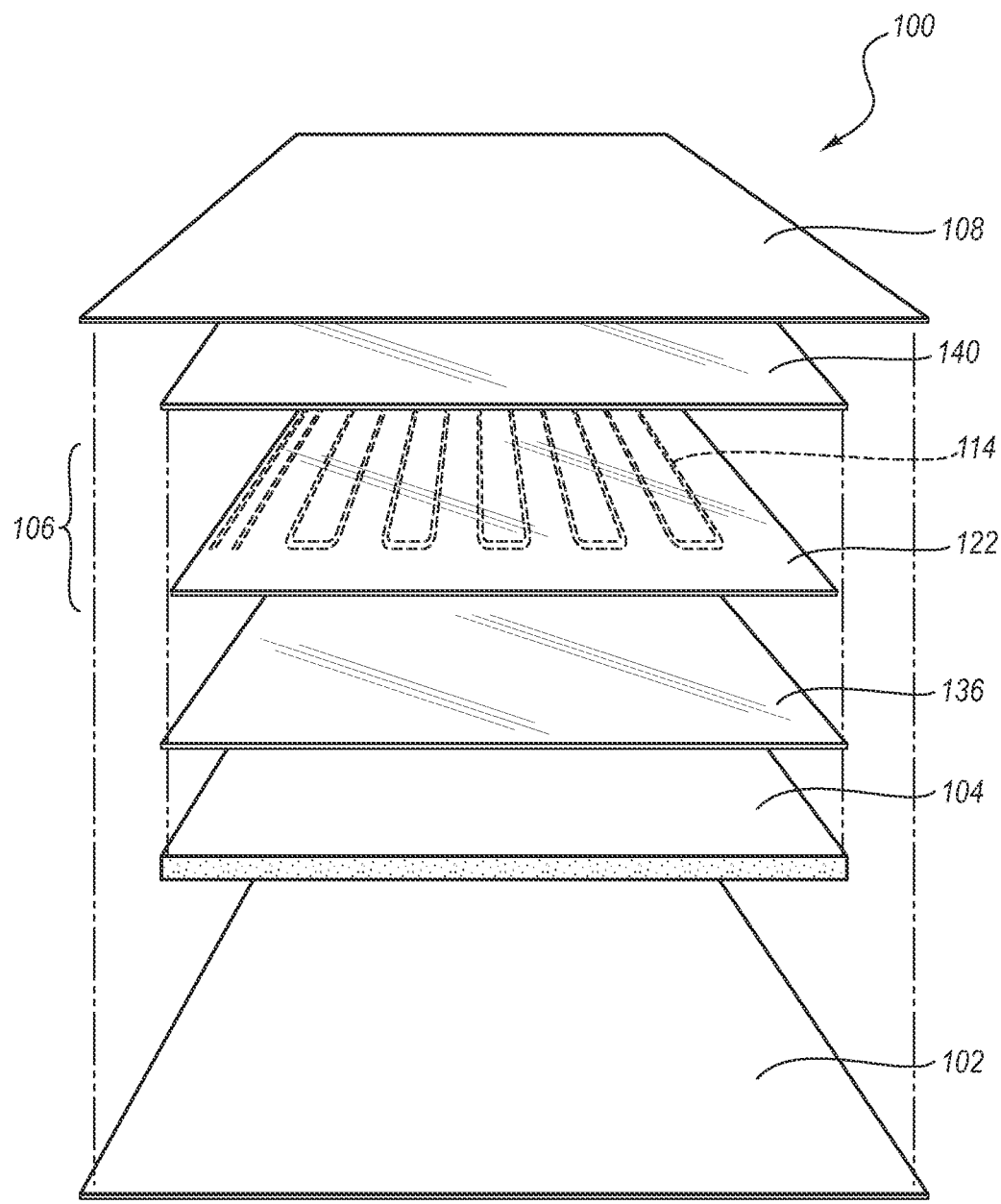
FIG. 3 illustrates an exploded view of some of the components of the heating unit of FIG. 1 showing the construction of the heating unit with adhesive layers.

An example of components implemented in one embodiment is illustrated in FIGS. 2 and 3. These Figures illustrate the construction of the heating unit, including materials used to assemble the heating unit. FIG. 2 illustrates a partially exploded view illustrating the flexible nature of a heating unit 100 that includes a first cover layer 102, an insulation layer 104, a heating element 106, and a second cover layer 108. In some embodiments, the heating element 106 includes a heat generating strip 114 and a heat spreading element 122, each of which will be described in greater detail below. The heating unit 100 further includes an incoming electrical connector 110. The heating unit can also include an outgoing electrical connector 112. While the example illustrated in FIG. 2 is illustrated as partially exploded, some finished embodiments may be manufactured such that the insulation layer 104 and the heating element 106 may be sealed between the first cover layer 102 and the second cover layer 108. Sealing processes and details will be discussed in more detail below.

FIG. 3 illustrates a fully exploded view of the heating unit 100 so as to more clearly illustrate the individual components of the heating unit 100. As illustrated in FIG. 3, first and second cover layers 102 and 108 are generally planar sheets of material that are disposed on opposing sides of the internal components of heating unit 100. During construction of heating unit 100, first cover layer 102 is positioned as illustrated in FIG. 3. Next, insulation layer 104 is positioned on top of first cover layer 102 and heating element 106 is then positioned on top of insulation layer 104. Finally, second cover layer 108 is positioned on top of heating element 106. With the various components of heating unit 100 so positioned, the peripheral edges of first and second layers 102 and 108 can be joined, sealed, or otherwise closed.

Heating unit 100, constructed as described herein, can be used in numerous applications that require heat to be transferred to an object or surface. As described herein, the various components of heating unit 100 are flexible such that heating unit 100 can be wrapped around objects, laid on top, beneath, or hung adjacent objects or surfaces, and rolled or folded up when not in use. In order to ensure that heating unit 100 and its various components retain their shape and their positions relative to one another, the various components of heating unit 100 can be attached to one another. For example, the various components of heating unit 100 can be glued, bonded, or otherwise held together. Attaching the components of heating unit 100 together helps to prevent the components from moving relative to one another within heating unit 100.

For example, attaching heating element 106 to insulation layer 104 ensures that heating element 106 will stay positioned next to insulation layer 104 and will not sag, bunch, or otherwise move within heating unit 100. In particular, because insulation layer 104 is formed of a stiffer material than heating element 106, attaching heating element 106 to insulation layer 104 provides stiffness to heating element 106. While insulation layer 104 is referred to as being formed of a "stiffer" material, it will be appreciated that in some embodiments insulation layer 104 may still be flexible such that it can be wrapped around a barrel or folded around a box, for example. Similarly, heat generating strip 114 and heat spreading element 122 can be attached to one another to ensure that heat generating strip 114 is properly positioned on heat spreading element 122, even after heating unit 100 is rolled, folded, and used several times. Likewise, heating element 106 and/or insulation layer 104 can be attached to first and/or second cover layers 102 and 108 to prevent the internal components of heating unit 100 from moving within first and second cover layers 102 and 108.

FIG. 3 illustrates one exemplary embodiment in which various components of heating unit 100 are attached together. For convenience of illustration, incoming electrical connector 110 and outgoing electrical connector 112 are omitted from FIG. 3. In the embodiment illustrated in FIG. 3, there are two interfaces between the heating unit components for attachment between the components. As used herein, an attachment interface is a surface where two or more components of heating unit 100 are attached together. The first attachment interface 136 is between the top surface of insulation layer 104 and the bottom surface of heating element 106. As noted herein, heating element 106 includes a heat generating strip 114 mounted on a heat spreading element 122. In the illustrated embodiment, the heat generating strip 114 is mounted on the bottom surface of heat spreading element 122 such that heat generating strip 114 is positioned between heating spreading element 122 and insulation layer 104. Attachment interface 136 is therefore between the top surface of insulation layer 104 and the bottom surface of heat spreading element 122, with heat generating element 114 mount on heat spreading element 122 therebetween.

The second attachment interface 140 is between the top surface of heat spreading element 122 and the bottom surface of second cover layer 108. In other embodiments, there is only the first attachment interface 136. Still in other embodiments, there are additional attachment interfaces, such as between the bottom surface of insulation layer 104 and the top surface of first cover layer 102.

Attachment interfaces 136 and 140 can be created by attaching the above identified components of heating unit 100 in any suitable manner so that the components maintain their relative positions one to another. In one exemplary embodiment, attachment interfaces 136 and 140 are created using an adhesive between the components of heating unit 100. One such adhesive suitable for attaching together the components of heating unit 100 is 30-NF FASTBOND™ available from 3M located in St. Paul, Minn. FASTBOND™ is a non-flammable, heat resistant, polychloroprene base adhesive.

In order to properly adhere the components of heating unit 100 together with FASTBOND™, the interfacing surfaces should be clean and dry. With the surfaces prepared, a uniform coat of FASTBOND™ is applied to both interfacing surfaces. After applying, the FASTBOND™ is allowed to dry completely, which typically takes about 30 minutes. Once the FASTBOND™ on both surfaces is dry, the two FASTBOND™ coated surfaces are joined together.

For example, when attaching insulation layer 104 to heat spreading element 122, a coat of FASTBOND™ is applied to the top surface of insulation layer 104 and the bottom surface of heat spreading element 122 over the top of heat generating strip 114. Once the FASTBOND™ on each surface is dry, heat spreading element 122 is positioned on top of insulation layer 104 and the two layers of FASTBOND™ adhere to one another. The same process can be followed to attach second cover layer 108 to the top surface of heat spreading element 122 or to attach the first cover layer 102 to the bottom surface of insulation layer 104.

In the illustrated embodiment, second cover layer 108 is attached to heating element 106 and heating element 106 is attached to insulation layer 104. Notably, however, insulation layer 104 and heating element 106 can be left unattached from first and/or second cover layers 102 and 108. Not attaching insulation layer 104 and heating element 106 to first and/or second cover layers 102 and 108 provides for flexibility and give in heating unit 100 when heating unit 100 is folded, rolled, or wrapped around an object. Specifically, heating unit 100 is configured to be wrapped around an object such that second cover layer 108 is adjacent the object and first cover layer 102 is positioned away from the object (see FIG. 1 in which first cover layer 102 is showing). When first and/or second cover layers 102 and 108 are not attached to insulation layer 104 and/or heating element 106, first and/or second cover layers 102 and 108 are able to move relative to insulation layer 104 and heating element 106 and stretch as heating unit 100 is wrapped around an object. In other embodiments, however, insulation layer 104 and first cover layer 102 are attached to one another while heating element 106 and second cover layer 108 are attached to one another. For example, when heating unit 100 is used on flat surfaces, such as the ground or a roof, the need for first and second cover layers 102 and 108 to be able to move relative to insulation layer 104 and heating element 106 is not as great.

Figure 4:
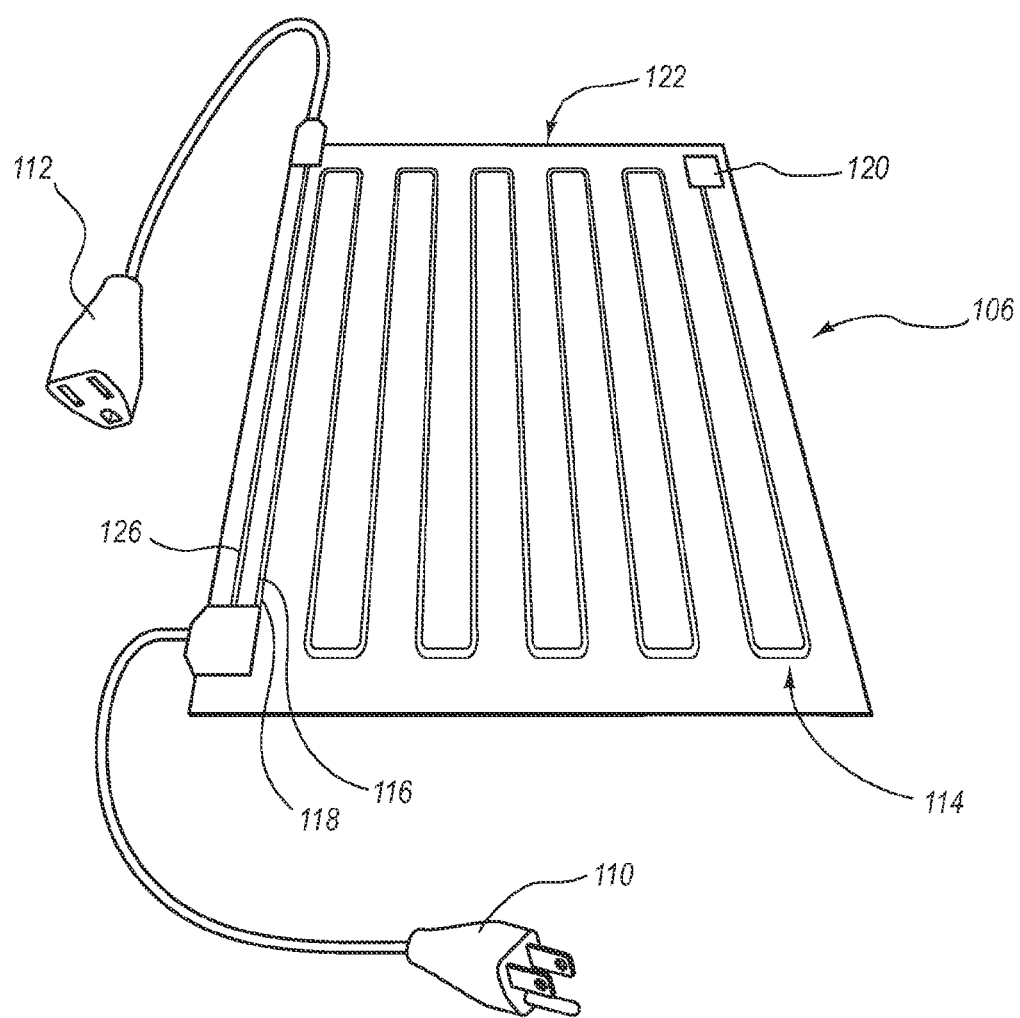
FIG. 4 illustrates details of a heat spreading element of the heating unit of FIG. 1.

The following discussion will now treat additional details and embodiments of the various components of the heating unit 100. Referring now to FIG. 4 and as noted above, in some embodiments the heating element 106 includes a heat generating strip 114. The heat generating strip 114 may be, for example, an electro-thermal coupling material or resistive element. In some embodiments, the heat generating strip may be a copper, copper alloy or other conductor. In one embodiment, the conductor is a network of copper alloy elements configured to generate about 9 W of power per linear foot of the heat generating strip. This may be achieved by selection of appropriate alloys for the heat generating element 114 in combination with selection of appropriate heat generating element wire sizes and circuit configurations. The conductor may convert electrical energy to heat energy, and transfer the heat energy to the surrounding environment. Alternatively, the heat generating element 114 may comprise another conductor, such as semiconductors, ceramic conductors, other composite conductors, etc., capable of converting electrical energy to heat energy. The heat generating strip 114 may include one or more layers for electrical insulation, temperature regulation, and ruggedization.

Notably, other heat sources may be used in addition to or as alternatives to the heat generating strip. For example, some embodiments may include the use of exothermic chemical reactions to generate heat or heating tubes which a heated liquid runs through.

With continuing reference to FIG. 4, the heat generating strip 114 is illustrated with two heat generating conductors 116 and 118. One of the two conductors is connected to a first terminal of the incoming electrical connector 110 while the other conductor is connected to a second terminal of the electrical connector 110. The first and second terminals may be connected to electrical sources as appropriate, such as generator supplied AC or DC sources, batteries, power inverters, etc. The two conductors 116 and 118 may be connected at one end to create a closed circuit allowing current to flow through the two conductors to generate heat.

In the example illustrated in FIG. 4, the two conductors are connected through a thermostat 120. In this example, the thermostat 120 includes a bi-metal strip based temperature control that disconnects the two conductors 116 and 120 at a pre-determined temperature. Examples of predetermined temperatures may be 33° F., 50° F., 75° F., 90° F., 110° F., and 130° F. Notably, these are only examples, and other temperatures may be alternatively used. This can be used to regulate the temperature of the heating unit 100 to prevent overheating, or to maintain the temperature at a temperature of about the pre-determined temperature.

Embodiments may be implemented where the temperature is determined by selecting a thermostat 120 with a fixed temperature rating. Other embodiment may be implemented where the temperature setting of the thermostat can be adjusted to a predetermined temperature at manufacturing time. In some embodiments, the thermostat may be user accessible to allow a user to adjust the thermostat settings. While in the example illustrated the thermostat is located at the ends of the conductors 116 and 118, it should be appreciated that in other embodiments the thermostat may be placed inline with one of the conductors 116 and 118. Additionally, some embodiments may include low voltage control circuitry including temperature control functionality, which controls application of power to the conductors 116 and 118 to regulate temperature.

It should further be appreciated that embodiments may be implemented where other temperature or current protections are included. For example, embodiments may include magnetic and/or thermal circuit breakers, fuses, semiconductor based over-current protection, ground fault protection, arc fault protection, etc. In some embodiments, these may be located at the ends of the conductors 116 and 118 or inline with one or more of the conductors 116 and 118 as appropriate.

Figures 5A, 5B:
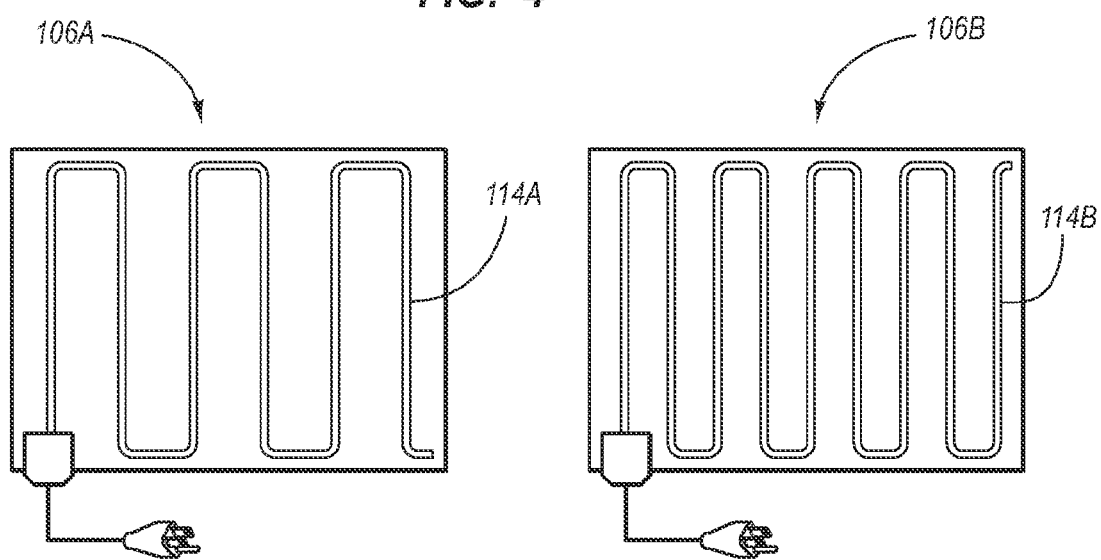
FIGS. 5A and 5B illustrate comparative alternate temperature arrangements for the heating unit of FIG. 1.

Additionally, controlling temperature may be accomplished by controlling the density of the heat generating element 114. This may be accomplished by controlling spacing between different portions of the heat generating element allowing for more or less material used for the heat generating element 114 to be included in the heating unit 100. This method may be especially useful when heat generating elements have a constant Wattage output per length of heat generating element. Thus a longer heat generating element 114 provides more heat than a shorter heat generating element 114. FIGS. 5A and 5B illustrate a comparative example where two alternative embodiments are illustrates. Each of the embodiments illustrates a heating unit 100 of the same size, but with different heat generating elements densities. The first embodiment illustrates a heating element 106A with a less dense heat generating element 114A, while the second embodiment illustrates a heating element 106B with a more dense heat generating element 114B.

By way of the method described herein, the temperature of fluid conduits 10 can be regulated. In particular, by way of a thermostat or the selection and configuration of the heating unit components, the temperature of the fluid conduits can be maintained at a desired temperature or within a desired temperature range. For example, when a fuel supply, such as propane gas, is flowing through fluid conduit 10, it is important to maintain the propane in its gaseous form to prevent interruptions to the flow of the propane. Thus, to prevent the propane from changing into its liquid form, the propane must be maintained above its boiling point temperature, which is approximately −43° F. Similarly, if water is flowing through fluid conduit 10, it may be important to maintain the water at a desired temperature. For example, maintaining the water above 32° F. will prevent the water from freezing. Additionally, the fluid or gas flowing through fluid conduit 10 may need to be maintained at a desired temperature for an intended use at a destination location. For example, if water is flowing through fluid conduit 10 to a shower facility, it may be desirable to maintain the water at a higher temperature, such as 80° F. Thus, the thermostats, configuration of the heating unit components, and the temperature protection mechanisms described herein enable a fluid conduit 10 to be maintained at a desired temperature or within a desired temperature range. By way of example, some desired temperatures may be −43° F. to 0° F., 33° F. to 50° F., 75 to 100° F., and 90° F. to 130° F. Notably, these are only examples, and other temperatures may be alternatively used.

Returning attention to FIG. 4, as noted above, the electrical heating element 106 may further include a heat spreading element. In general terms, the heat spreading element 122 is a layer of material capable of drawing heat from the heat generating element 114 and distributing the heat energy away from the heat generating element 114. Specifically, the heat spreading element 122 may comprise a metallic foil, wire mesh, carbon mesh, graphite, a composite material, or other material.

The heat-spreading element 122 in one embodiment is an electrically-conductive material comprising carbon. Graphite is one example of an electrically-conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element. In one embodiment, the material comprising carbon comprises sufficient electrical conductivity to act as a ground connection, as will be discussed in more detail below. The heat-spreading element 122 may further comprise a carbon derivative, or a carbon allotrope.

One example of a material suitable for a heat spreading element 122 is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface which in turn allows for more heat to be drawn out of the heating element 114.

The heat spreading element 122 may comprise a material that is thermally isotropic in one plane. The thermally isotropic material may distribute the heat energy more evenly and more efficiently. One such material suitable for forming the heat spreading element 122 is GRAFOIL® available from Graftech Inc. located in Lakewood, Ohio. In particular, GRAFOIL® is a flexible graphite sheet material made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressibly resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties. For example, the standard density of GRAFOIL® is about 1.12 g/ml. It has been shown that three stacked sheets of 0.030" thick GRAFOIL® C have similar thermal coupling performance to a 0.035" sheet of cold rolled steel, while weighing about 60% less than the cold rolled steel sheet.

Another product produced by GrafTech Inc. that is suitable for use as a heat spreading element 122 is EGRAF® SPREADERSHIELD™. The thermal conductivity of the SPREADERSHIELD™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 122 serves as a conduit for the heat within the plane of the heat spreading element 122, and quickly distributes the heat more evenly over a greater surface area than a foil. The efficient planar heat spreading ability of the planar heat spreading element 122 also provides for a higher electrical efficiency, which facilitates the use of conventional power supply voltages such as 120 volts on circuits protected by 20 Amp breakers, instead of less accessible higher voltage power supplies. In some embodiments, the heat spreading element 122 is a planar thermal conductor. In certain embodiments, the graphite may be between 1 thousandth of an inch thick and 40 thousandths of an inch thick. This range may be used because within this thickness range the graphite remains pliable and durable enough to withstand repeated rolling and unrolling as the heating unit 100 is unrolled for use and rolled up for storage.

The heat spreading element 122 may comprise a flexible thermal conductor. In certain embodiments, the heat spreading element 122 is formed in strips along the length of the heat generating element 114. In alternative embodiments, the heat spreading element 122 may comprise a contiguous layer.

In some embodiments, the heat spreading element 122 may also include functionality for conducting electrical energy and converting electric energy to thermal energy in a substantially consistent manner throughout the heat spreading element. Graphite heat spreading elements may be particularly well suited for these embodiments. In such an embodiment, a heat generating element 114 may be omitted from the heating unit 100 as the heat spreading element 122 serves the purposes of conveying current, producing heat due to resistance, and evenly distributing the heat.

The small size and thickness of the graphite minimizes the weight of the heat spreading element 122. The graphite containing heat spreading element may be pliable such that the graphite can be rolled lengthwise without breaking the electrical path through the graphite.

In some embodiments, the heat spreading element 122 may include an insulating element formed of a thin plastic layer on both sides of the heat-spreading element 122. The insulating element may additionally provide structure to the heat-spreading material used in the heat spreading element 122. For example, the insulating element may be polyethylene terephthalate (PET) in the form of a thin plastic layer applied to both sides of heat-spreading element 122 comprising graphite. Those of skill in the art will appreciate that such a configuration may result in the insulating element lending additional durability to the heat-spreading element 122 in addition to providing electrical insulation, such as electrical insulation from the electrical current in the heat generating element 114. It should be noted that the heating generating element 114 may include its own electrical insulation as well as described above.

In some embodiments, the heat spreading element 122 may include a heat conducting liquid such as water, oil, grease, etc.

In certain embodiments, the heat generating element 114 is in direct contact with the heat spreading element 122 to ensure efficient thermo-coupling. Alternatively, the heat spreading element 122 and the heat generating element 114 are integrally formed. For example, the heat spreading element 122 may be formed or molded around the heat generating element 114. Alternatively, heat generating strip 114 and the heat spreading element 122 may be adhesively coupled as described herein.

Notably, while temperature may be controlled with the use of thermostats as described above, other embodiments may implement other design criteria to control temperature. For example, some embodiments may use appropriate selection of the heat spreading element 122 and/or the arrangement of the heat generating element 114. Illustratively, the heat retention properties of the heat spreading element 122 may be a factor in regulating temperatures at which a heating unit 100 will operate. Further, the density of the heat generating element 114 with respect to the size of the heating unit 100 or the heat spreading element 122 can be used set the operating temperatures or to regulate temperatures.

In some embodiments, the heating unit can be sized to substantially enclose fluid conduits of various lengths and diameters. Additionally, as described elsewhere herein, multiple heating units can be coupled together to provide heat to fluid conduits of nearly any size. In one exemplary embodiment, the heating unit is approximately twelve and one half (12½) feet long and one (1) foot wide. In another exemplary embodiment, the heating unit is approximately six (6) feet long and eight (8) inches wide. In still another embodiment, the heating unit is approximately twenty-five (25) feet long and two and one half (2½) feet wide. It will be appreciated, however, that the heating unit can be sized and configured to substantially enclose fluid conduits of any size or shape.

Returning once again to FIGS. 2 and 3, FIGS. 2 and 3 illustrate an insulating layer 104. The insulating layer 104 may be used to reflect or direct heat or to prevent heat from exiting in an undesired direction. For example, it may be desirable to have all or most of the generated heat be directed towards a particular surface of the heating unit 100. In the embodiment illustrated in FIGS. 1 and 6A-6C, for example, it may be desirable to direct heat towards the walls of the fluid conduits 10 while directing heat away from an exterior environment in which the fluid conduits 10 are located. In the example illustrated, it may be desirable to have heat directed towards the side of the heating unit 100 which includes the second cover layer, while directing heat away from the side that includes the first cover layer. The insulating layer 104 may be used to accomplish this task. Some exemplary embodiments of the heating unit have been implemented where about 95% of heat generated is directed towards a desired surface of the heating unit.

The insulating layer 104 may include a sheet of polystyrene, cotton batting, GORE-TEX®, fiberglass, foam rubber, etc. In certain embodiments, the insulating layer 104 may allow a portion of the heat generated by the heat generating element 114 to escape the top of the second cover layer 108 if desired. For example, the insulating layer 104 may include a plurality of vents to transfer heat to the second cover layer 108. In certain embodiments, the insulating layer 104 may be integrated with either the first cover layer 102 or the second cover layer 108. For example, the first cover layer 102 may include an insulation fill or batting positioned between two films of nylon.

In some embodiments, first and second cover layers 102 to 108 may comprise a textile fabric. The textile fabric may include natural or synthetic products. For example, the first and second cover layers 102 to 108 may comprise burlap, canvas, cotton or other materials. In another example, first and second cover layers 102 to 108 may comprise nylon, vinyl, or other synthetic textile material. The first and second cover layers 102 to 108 may comprise a thin sheet of plastic, metal foil, polystyrene, or other materials.

In manufacturing the heating unit 100, the heating element 106 and insulation layer 104 may be sealed between the first and second cover layers 102 and 108. As illustrated in FIGS. 2 and 3, the first and second cover layers 102 and 108 extend slightly beyond the heating element 106 and insulation layer 104. This allows the first and second cover layers 102 and 108 to be sealed, such as by using an adhesive, heat welding, or another other appropriate method or combination of methods.

Additionally, the heating unit 100 may be constructed such that the first and second cover layers 102 and 108 may include one or more fasteners 124 for securing or connecting the heating unit 100. In some embodiments, the fasteners 124 may be attached or formed into the corners of the heating unit 100. Additionally, fasteners 124 may be distributed about the perimeter of the heating unit 100. In some embodiments, the fastener 124 is a hook and loop fastener such as Velcro®. For example, the heating unit 100 may include a hook fabric on one side and a loop fabric on an opposite side. In other alternative embodiments, the fastener 124 may include grommets, snaps, zippers, adhesives, or other fasteners. Further, additional objects may be used with the fasteners to accomplish fastening. For example, when grommets are used, elastic cord, such as fixed or adjustable bungee cord may be used to connect to grommets on opposite sides of the heating unit 100. This may be used, for example, to securely wrap the heating unit around an object, such as a fluid conduit.

A number of fastener arrangements may be implemented for securing the opposing sides of the heating unit together. For example, FIG. 1 illustrates a first portion of the heating unit 100 having a plurality of grommets therein. Associated with each of the grommets is an elastic chord that can be wrapped around the heating unit with both ends of the chord being attached to its associated grommet. Other fasteners that can be employed to secure the heating unit around fluid conduits include snap fasteners, zippers, hook and loop type fasteners such as VELCRO®, and the like. Fasteners 124 can be adapted to enable selective coupled and decoupling to allow heating unit 100 to be selectively opened and closed. Alternatively, fasteners 124 can be adapted to permanently close heating unit 100. For example, grommet fasteners 124 can be secured to opposing portions of heating unit 100, where a single grommet may be secured to both opposing portions such that the heating unit permanently maintains a substantially wrapped shape.

In some embodiments, the first cover layer 102 may be positioned at the top of the heating unit 100 and the second cover layer 108 may be positioned on the bottom of the heating unit 100. In certain embodiments, the first cover layer 102 and the second cover layer 108 may comprise the same or similar material. Alternatively, the first cover layer 102 and the second cover layer 108 may comprise different materials, each material possessing properties beneficial to the specified surface environment.

For example, the first cover layer 102 may comprise a material that is resistant to sun rot such as such as polyester, plastic, and the like. The second cover layer 108 may comprise material that is resistant to mildew, mold, and water rot such as nylon. The cover layers 102 and 108 may comprise a highly durable material. The material may be textile or sheet, and natural or synthetic. For example, the cover layers 102, 108 may comprise a nylon textile. Additionally, the cover layers 102, 108 may be coated with a water resistant or waterproofing coating. For example, a polyurethane coating may be applied to the outer surfaces of the cover layers 102, 108. Additionally, the top and bottom cover layers 102, 108 may be colored, or coated with a colored coating such as paint. In some embodiments, the color may be selected based on heat reflective or heat absorptive properties. For example, the top layer 102 may be colored black for maximum solar heat absorption. The bottom layer 102 may be colored grey for a high heat transfer rate or to maximize heat retention beneath the cover.

As illustrated in FIGS. 1, 2, and 6A-6C, the heating unit can also include a sealing flap 142 that extends along the length of the heating unit 100 that is adapted to reduce the amount of heat lost when the heating unit 100 is wrapped around a fluid conduit. Along one edge of the heating unit 100 illustrated in FIG. 2, the top and bottom cover layers 102, 108 extend beyond the heating element 106 and the insulating layer 104 to form sealing flap 142. While the illustrated embodiment does not include heating element 106 or insulating layer 104 in the sealing flap 142 of heating unit 100, it will be appreciated that heating element 106 and insulating layer 104 can also extend into the sealing flap 142 of heating unit 100. It will be appreciated that sealing flap 142 can be formed independently of top and bottom cover layers 102, 108. For example, sealing flap 142 can be formed separately from top and bottom cover layers 102, 108 and attached to top and/or bottom cover layers 102, 108/

Figure 6A:
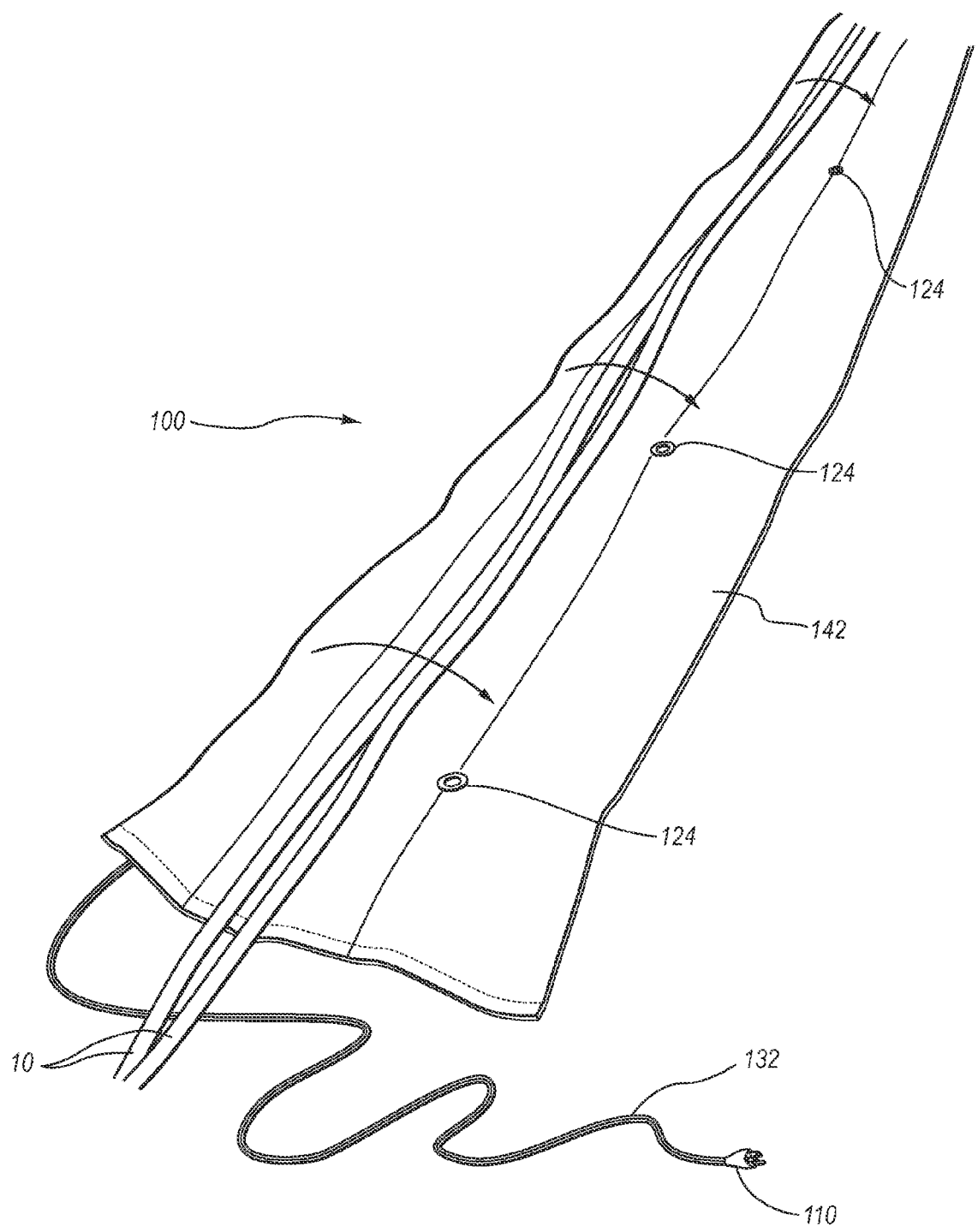
FIGS. 6A through 6C illustrate one method of applying the heating unit of FIG. 1 to one or more fluid conduits.
Figure 6B:
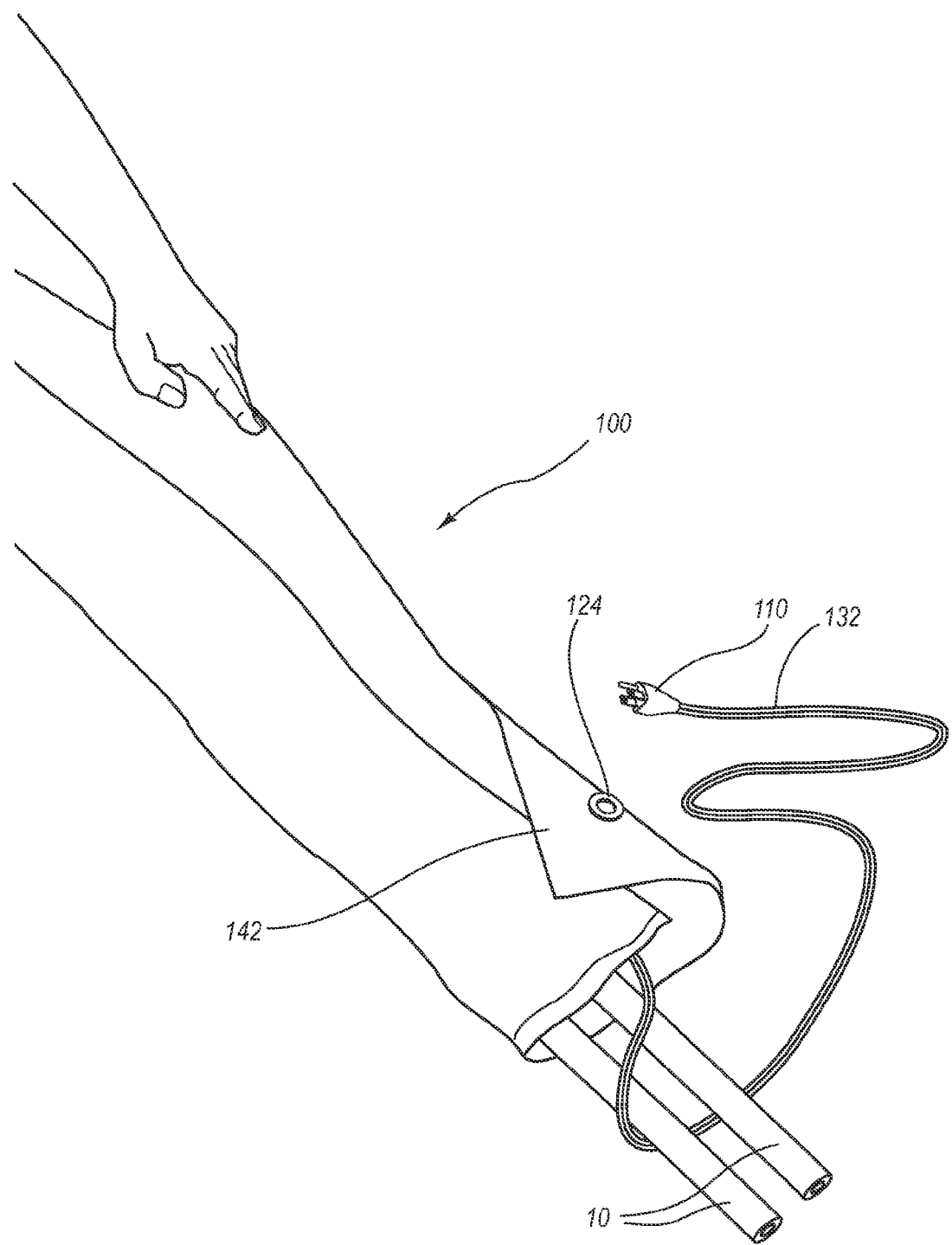
Figure 6C:
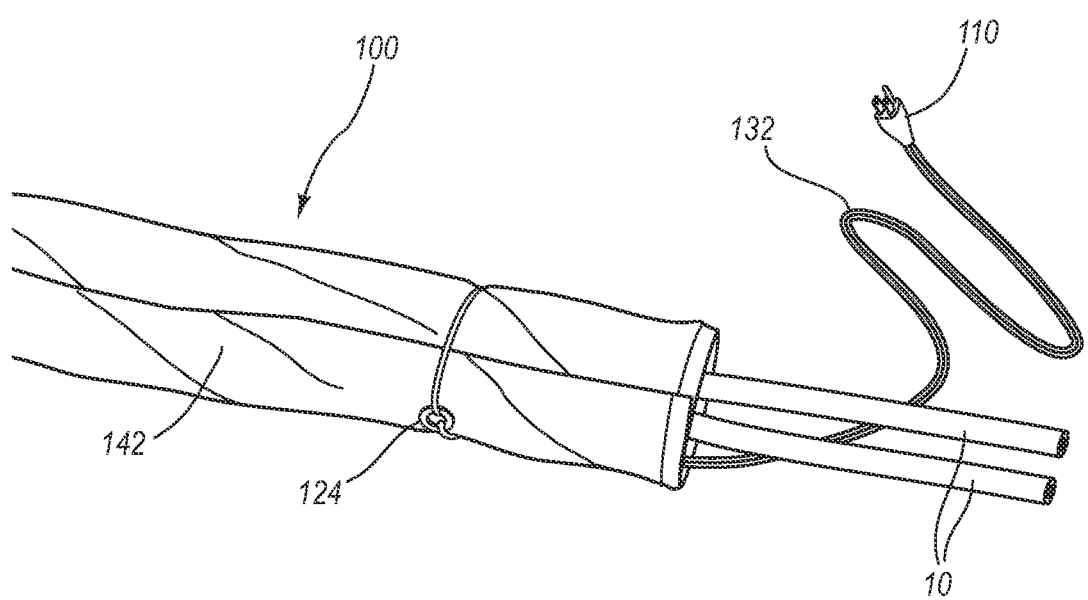

Heating unit 100 can be wrapped and secured around the outer wall(s) of one or more fluid conduits as illustrated in FIGS. 6A-6C. Specifically, as illustrated in FIG. 6A, with heating unit 100 laid open, the fluid conduits can be positioned generally in the middle thereof such that the lengths of the heating unit and the fluid conduits are parallel. So positioned, the heating unit 100 can be folded over the fluid conduits as shown in FIG. 6B. As noted herein, each of the components of heating unit 100 is pliable, thus enabling heating unit 100 to be folded over or wrapped around fluid conduit 10. To facilitate the folded of heating unit 100 over fluid conduit 10, insulating layer 104 can include a score therein.

With the heating unit 100 folded over the fluid conduit 10, the sealing flap 142 can then be folded over to cover any openings between the opposing sides of the heating unit 100. Fasteners 124 can then be used to secure the heating unit 100. For example, in FIG. 6C, fasteners 124 comprise grommets and elastic chords. The grommets and elastic chords are spaced along at least one of the long edges of heating unit 100. The elastic chords can be wrapped around the heating unit 100 to maintain heating unit 100 on the fluid conduits.

The embodiment shown in FIGS. 1-3 includes a six (6) foot power cord 132 connected to the heat generating element 114. Other cord lengths may also be implemented within the scope of embodiments of the invention. The power cord may additionally be connected to an incoming electrical connector 110 such as an AC power plug, bare wire connector, alligator clip connectors, a cigarette lighter plug connector or other appropriate connector for connecting the power cord to a source of power.

Notably, some embodiments may be implemented with interchangeable incoming electrical connectors. For example, embodiments may include a kit which includes a heating unit 100 with a two pin auto connector. The kit may further include a wire without an additional connector connected to a mating two pin auto connector, a set of alligator clips connected to a mating two pin auto connector, and a cigarette lighter plug connected to a mating two pin auto connector. A user can then select an appropriate incoming electrical connector 110. For example, a user may select the wire without an additional connector if the heating unit is to be hard wired to an electrical system, such as an automobile, boat, or other electrical system. Cigarette lighter plugs or alligator clip connectors could be selected for more temporary connectors.

Some embodiments may also include various fault protections. For example, embodiments may include an incoming electrical connector 110 which includes ground fault circuit interruption capabilities so as to make the heating unit 100 suitable for use in wet or outdoor environment. Embodiments may include over current protection such as breakers or fuses. Embodiments may include arc fault circuit interruption capabilities to address problems related to fatigue of wires or crushing of wires.

Embodiments may further include provisions for grounding the heating unit 100. For example, the heating unit is illustrated in FIGS. 1-3 includes an incoming electrical connector in the form an AC plug, which includes two power terminals 128 and a grounding terminal 130. The power cord 132 may include three conductors, one connected to each power terminal 128, and the third connected the grounding terminal 130. The two conductors connected each to a respective power terminal 128 connect as described above to the heat generating element 114. The third conductor may be connected so as to ground the heating unit 100. This may be done, for example by including an electrically conductive layer (not shown) in the heating unit 100 which is electrically connected to the grounding terminal 130.

In an alternative embodiment, due to the electrically conductive nature of the heat spreading element 122 when a graphite based material is used for the heat spreading element 122, the grounding terminal 130 may be electrically coupled to the heat spreading element 122. This may be accomplished in one example, by using a ground coupling in the form of a spade connector or other connector which passes through a protective layer of the heat spreading element so as to be in electrical contact with the conductive portions of the heat spreading element 122. In one embodiment, the ground couplings comprise planar rectangular metal connection blades that would normally be used as the hot and/or neutral connection blades of a power coupling such as a power coupling which connects to a power source. In one embodiment, ground coupling spade connector further comprises barbs configured to cut into the heat-spreading element 122 and engage the heat-spreading element 122 such that the blade does not come loose. In alternative embodiments, the blade may be connected to the heat-spreading element 122 with an adhesive that does not electrically insulate the heat-spreading element 122 from the blade. In addition, the plane of the blade may be placed parallel to the plane of the heat-spreading element 122 such that a maximum amount of the surface area of the blade is in direct contact with the heat-spreading element 122. Such a configuration may increase the contact area between the two surfaces and results in a better electrical and physical connection. Furthermore, such a configuration can leverage the lower in-plane resistivity of the heat-spreading element 122.

Additionally, some embodiments may include an outgoing electrical connector 112. This may be used, for example, to allow chaining of heating units together. In the example illustrated, the outgoing electrical connector 112 is connected electrically to the incoming electrical connector 110 through conductors 126 passing through the heating unit 100. Other embodiments may allow the incoming electrical connector 110 and outgoing electrical connector 112 to be more or less proximate to each other as appropriate.

A grounding terminal 132 of the outgoing electrical connector 112 may be electrically connected to the grounding terminal 130 of the incoming electrical connector 110. This may be accomplished by wiring the two terminals together or connecting both grounding connectors to the same grounding surface, such as a grounding layer, or to the heat spreading element 122 as described above.

Some embodiments may further include timing circuitry such that a user can select when heating should occur. The timer may be an electronic controlled device supplied by the electrical connector 112 and may include internal switching such as relays or solid state switches for supplying power to the heat generating strip 114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A heating unit for use in heating a fluid conduit, the heating unit comprising:
opposing first and second cover layers, at least one of the first and second cover layers forming a sealing flap;
an electrical heating element disposed between the first and second cover layers, the electrical heating element comprising:
an electrically resistive heat generating element for converting electrical energy to heat energy, the heat generating element being disposed within an area in the heating unit that is defined by a length and a width; and
a heat spreading element comprising a substantially uniform and contiguous laminate sheet of carbon, the substantially uniform and contiguous laminate sheet of carbon having an area defined by a length and a width, the area of the substantially uniform and contiguous laminate sheet of carbon being greater than the area of heat generating element, the substantially uniform and contiguous laminate sheet of carbon being thermally coupled to and electrically insulated from the heat generating element for substantially uniformly distributing the heat energy over substantially an entire surface area of the second cover layer;
a thermal insulation layer positioned between the electrical heating element and the first cover layer;
a receiving power connector electrically connected to the heat generating element, the receiving power connector configured to couple to an electrical power source; and one or more fasteners disposed in the first or second cover layer to enable the heating unit to be wrapped around a fluid conduit and secured by the one or more fasteners, wherein the heating unit is sized to cover substantially the entire outer wall circumference and at least a portion of a length of the fluid conduit.

2. The heating unit of claim 1, wherein the heating unit comprises a thermostat configured to regulate an operating temperature of the heating unit.

3. The heating unit of claim 2, wherein the thermostat is set at a predetermined temperature.

4. The heating unit of claim 2, wherein the thermostat is user adjustable.

5. The heating unit of claim 1, wherein the heat spreading element comprises graphite.

6. The heating unit of claim 1, wherein the heat spreading element is thermally isotropic in one plane.

7. The heating unit of claim 1, further comprising an outgoing electrical connector electrically coupled to the receiving power connector, the outgoing electrical connector being configured to couple to receiving power connectors of other heating units.

8. The heating unit of claim 1, wherein the first and second cover layers cooperate to form the sealing flap and the electrical heating and the thermal insulation layer are disposed between the first and second cover layers inside the sealing flap.

9. The heating unit of claim 1, wherein the heat spreading element is attached to the heat generating element with an adhesive.

10. The heating unit of claim 1, wherein the first and second cover layers cooperate to form the sealing flap and the electrical heating and the thermal insulation layer are not disposed between the first and second cover layers inside of the sealing flap.

11. The heating unit of claim 1, wherein the one or more fasteners comprise grommets, snaps, zippers, or a combination thereof.

12. The heating unit of claim 1, wherein the heating unit comprises a timer configured to control when the heating unit supplies heat energy.

13. A heating unit for use in heating a fluid conduit, the heating unit comprising:
   a first cover layer and a second cover layer associated with one another to form an envelope defining an interior portion, the envelope having opposing first and second edges extending along a length of the envelope, the opposing first and second edges being positionable adjacent to one another when the heating unit is disposed about a fluid conduit;
   an electrical heating element disposed within the interior portion of the envelope formed by the first cover layer and the second cover layer, the electrical heating element comprising:
      an electrically resistive heat generating element for converting electrical energy to heat energy, the heat generating element being disposed within an area in the heating unit that is defined by a length and a width; and
      a heat spreading element comprising a substantially uniform and contiguous laminate sheet of carbon, the substantially uniform and contiguous laminate sheet of carbon having an area defined by a length and a width, the area of the substantially uniform and contiguous laminate sheet of carbon being greater than the area of heat generating element, the substantially uniform and contiguous laminate sheet of carbon being thermally coupled to and electrically insulated from the heat generating element for substantially uniformly distributing the heat energy over substantially an entire surface area of the second cover layer;
   a thermal insulation layer disposed within the envelope formed by the first cover layer and the second cover layer, wherein a first side of the thermal insulation layer is positioned adjacent to a first side of the electrical heating element, and wherein a second side of the thermal insulation layer is positioned adjacent an interior surface of the first cover layer;
   a sealing flap that extends from one of the opposing first and second edges and along the length of the heating unit, such that the sealing flap substantially covers the adjacently positioned opposing first and second edges when the heating unit is disposed about a fluid conduit to limit the loss of heat energy between the opposing first and second edges, wherein the sealing flap is formed by the first cover layer, the second cover layer, and the electrical heating element and the thermal insulation layer disposed therebetween;
   a receiving power connector electrically connected to the heat generating element, the receiving power connector configured to couple to an electrical power source; and
   one or more fasteners configured to secure the heating unit around the fluid conduit,
   wherein the heating unit is sized to cover substantially the entire outer wall circumference and at least a portion of the length of the fluid conduit.

14. The heating unit of claim 13, wherein the heat spreading element comprises graphite.

15. The heating unit of claim 13, wherein the heating unit is adapted to maintain the fluid conduit within a predetermined temperature range.

16. A heating unit for use in heating a fluid conduit, the heating unit comprising:
   opposing first and second cover layers, at least one of the first and second cover layers forming a sealing flap;
   an electrical heating element disposed between the first and second cover layers, the electrical heating element comprising:
      an electrically resistive heat generating element for converting electrical energy to heat energy, the heat generating element being disposed within an area in the heating unit that is defined by a length and a width; and
      a heat spreading element comprising a substantially uniform and contiguous laminate sheet of carbon, the substantially uniform and contiguous laminate sheet of carbon having an area defined by a length and a width, the area of the substantially uniform and contiguous laminate sheet of carbon being greater than the area of heat generating element, the substantially uniform and contiguous laminate sheet of carbon being thermally coupled to and electrically insulated from the heat generating element for substantially uniformly distributing the heat energy over substantially an entire surface area of the second cover layer;
   a thermal insulation layer positioned between the electrical heating element and the first cover layer;
   a receiving power connector electrically connected to the heat generating element, the receiving power connector configured to couple to an electrical power source; and one or more fasteners to enable the heating unit to be wrapped around a fluid conduit and secured by the one or more fasteners, wherein the heating unit is sized to cover substantially the entire outer wall circumference and at least a portion of a length of the fluid conduit.

17. The heating unit of claim 16, wherein the heat spreading element comprises graphite.

18. The heating unit of claim 16, wherein the heat spreading element is thermally isotropic in one plane.

19. The heating unit of claim 16, wherein the first and second cover layers cooperate to form the sealing flap and the electrical heating and the thermal insulation layer are disposed between the first and second cover layers inside the sealing flap.

20. The heating unit of claim 16, wherein the first and second cover layers cooperate to form the sealing flap and the electrical heating and the thermal insulation layer are not disposed between the first and second cover layers inside of the sealing flap.

* * * * *